(12) United States Patent
Serafini

(10) Patent No.: US 8,662,013 B2
(45) Date of Patent: Mar. 4, 2014

(54) GRIPPING DEVICE FOR A MILKING UNIT

(75) Inventor: Massimo Serafini, Podenzano (IT)

(73) Assignee: Milkline S.r.L., Pondenzano (PC) (IT)

( * ) Notice: Subject to any disclaimer, the term of this patent is extended or adjusted under 35 U.S.C. 154(b) by 0 days.

(21) Appl. No.: 13/564,481

(22) Filed: Aug. 1, 2012

(65) Prior Publication Data

US 2014/0033982 A1    Feb. 6, 2014

(51) Int. Cl.
*A01J 3/00* (2006.01)
*A01J 7/00* (2006.01)

(52) U.S. Cl.
USPC ............. 119/14.54; 119/14.1; 119/14.23; 119/14.55

(58) Field of Classification Search
USPC ............ 119/14.54, 14.23, 14.1, 14.37, 14.39, 119/14.45, 14.55
See application file for complete search history.

(56) References Cited

U.S. PATENT DOCUMENTS

| | | | |
|---|---|---|---|
| 730,119 A | 6/1903 | Hanson | |
| 1,686,115 A | 10/1928 | Anderson | |
| 4,655,492 A | 4/1987 | Landry | |
| 5,960,738 A | 10/1999 | Sanford | |
| 6,014,945 A * | 1/2000 | Gustafson | 119/14.01 |
| 6,519,806 B2 * | 2/2003 | Tamborini et al. | 15/339 |
| 6,802,150 B2 | 10/2004 | Harden | |
| 2004/0144016 A1 | 7/2004 | Harden | |
| 2013/0019807 A1 * | 1/2013 | Holmqvist et al. | 119/14.45 |

FOREIGN PATENT DOCUMENTS

DE            6604310        1/1970
WO    WO2007/129888 A1    11/2007

OTHER PUBLICATIONS

Search Report and Written Opinion completed Mar. 15, 2012 by the European Patent Office for originally filed Italian application No. IT MI20111414, filed Jul. 28, 2011.

* cited by examiner

*Primary Examiner* — Kimberly Berona
*Assistant Examiner* — Michael Wang
(74) *Attorney, Agent, or Firm* — Abelman, Frayne & Schwab

(57) ABSTRACT

A gripping device (10, 10') for a milking unit (12, 12') provided with a manifold (14, 62), a pulse tube (16, 64), shells and teat-cups to be connected to the udders of the animal, the gripping device applied to a terminal portion of the pulse tube (16, 64) connected to the manifold (14, 62), said device comprising means for a firm, safe and ergonomic grip and means for a quick replacement and maintenance of the unit or components thereof.

21 Claims, 4 Drawing Sheets

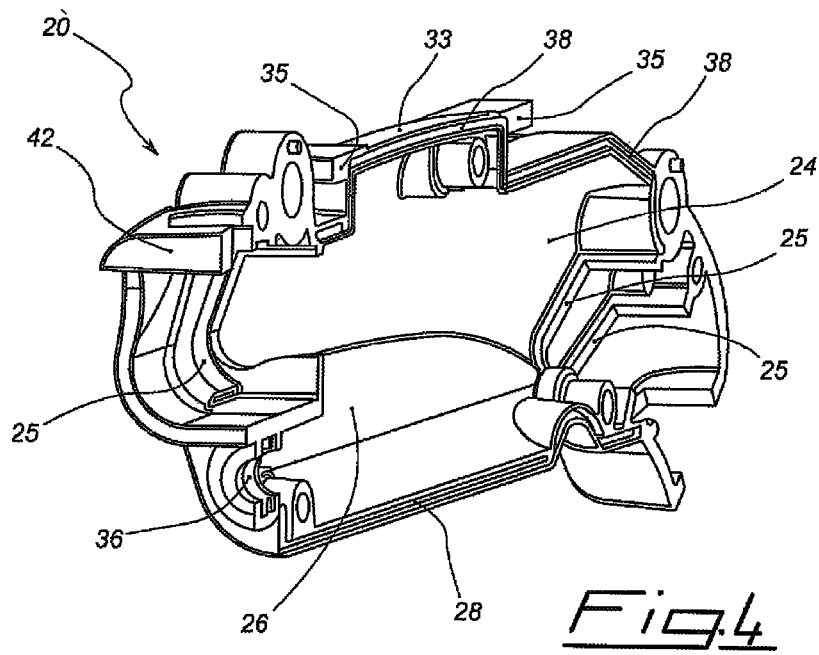
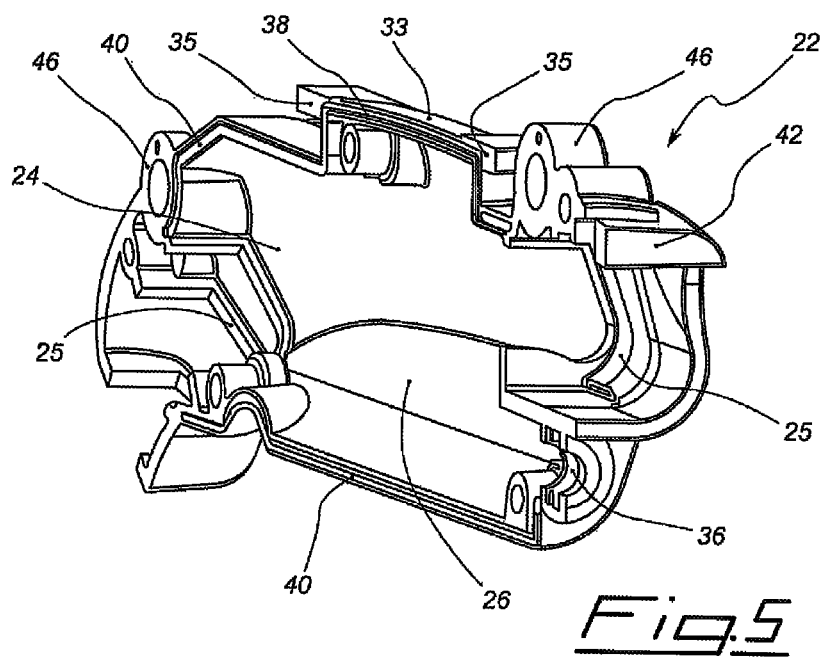

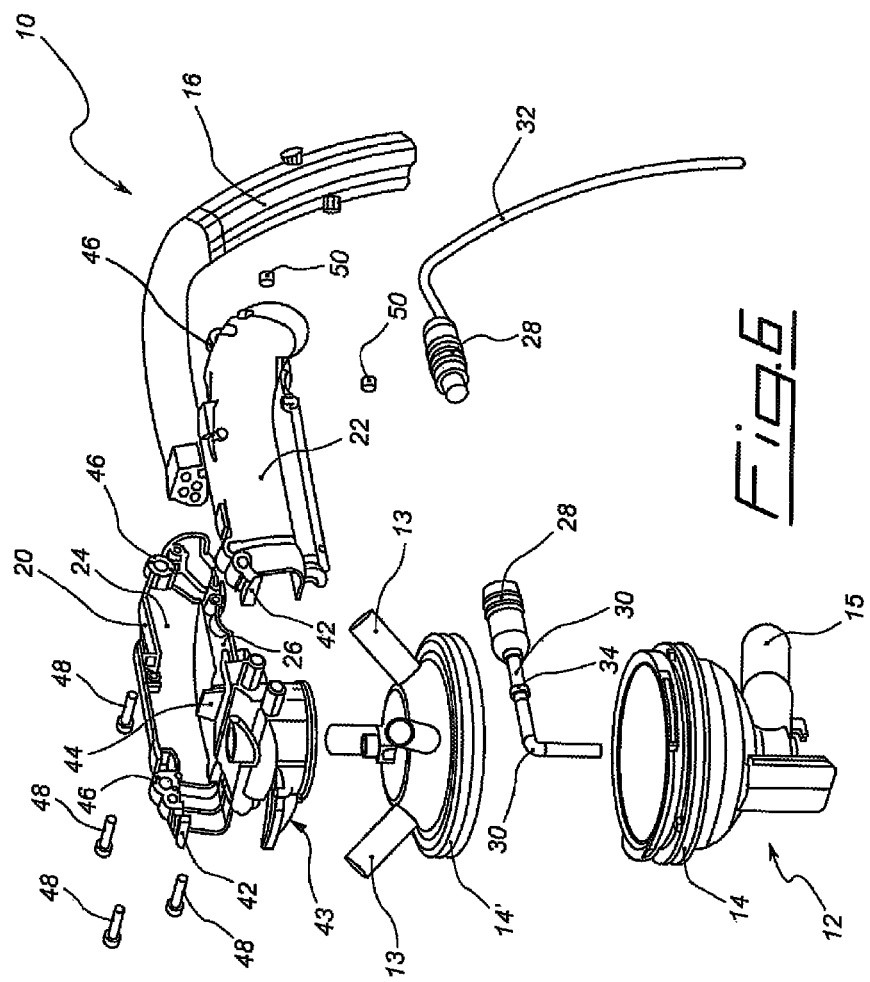

GRIPPING DEVICE FOR A MILKING UNIT

BACKGROUND OF THE INVENTION

1. Field of the Invention

The present invention relates to a gripping device for a milking unit used for the mechanised collection of milk from livestock of various kinds such as cattle, sheep and goats.

2. Description of the Related Art

Mechanised milking has considerable advantages compared to traditional hand milking in that it improves the collection process of the milk enabling the operator to increase milking capacity in terms of the livestock treatable with a single milking device, reducing stress to the animal and thereby improving the quality of the milk and complying with the hygiene and health parameters of the sector.

The devices used for automated/mechanised milking comprise two or four shells fitted with teat-cups to be connected to the udders of the animal, a manifold for collecting the milk, a tube conveying the milk present in the manifold to the recipients or containers and a further tube, called a pulse tube, connected to a pump suitable for aspirating air to create negative pressure or a vacuum (not continuously actuated but intermittently) needed to permit the output of milk from the udders to which the shells or teat-cups are connected.

In order to improve and optimise the mechanised/automated milking process further with a view to causing as little stress as possible to the animal and thereby guarantee good quality of the milk, an application solution has been developed defined by a milking device of the single quarter udder type in which the pulsing vacuum action is applied to the single shell. Such devices are also provided with sensors which transmit to a control unit the signals coming from each single udder quarter (such as the signals relative to the electric conductivity of the milk, important for preventing any intra-udder inflammation or mastitis) and needed to control the functioning of each single udder quarter as well as the health of the animal milked.

According to such technology, each shell is independent of the others and has a dedicated line or duct for the application of the negative pressure or vacuum.

In addition, in such type of device the pulse tube may comprise the channels which take the vacuum to the shells and the cable which transmits the signals detected by the sensor to the control unit may be positioned outside the pulse tube or run inside the same. Said pulse tube is generally made in extruded rubber.

The pulse tube, whether of the type used for traditional mechanised or single udder quarter milking, is rigid and rather cumbersome as regards size and the milking operator grasps it with a hand so as to position or connect the shells to the animal's udders.

However such configuration has a drawback related to the fact that the operator does not grasp the pulse tube in a specific point or area and consequently such grip is uncomfortable, insecure and such as to possibly determine the inopportune falling of the milking unit and damage thereof.

The same is true in the case in which the operator, rather than grasping the milking unit by the pulse tube, grasps the manifold.

A further drawback is represented by the fact that the operator, so as to prevent fluke falling of the milking unit during the positioning step, adopts unnatural and awkward stances detracting from optimal working conditions and painful to the animal, as well.

A further drawback is represented by the difficulty encountered by the operator in the case of replacing the milking unit or sensors. In fact, the cable connecting the sensor and the control unit is usually about two meters long and, in any case, equal to the distance between the sensor and the control unit. In the case, for example, of the substitution of a sensor, with the connection cable running inside the pulse tube, said cable would need to be extracted for the entire length of the pulse tube and reinserted therein during the assembly phase of the replacement sensor or milking unit. Such operation, as well as being difficult on account of the friction between the cable and the pulse tube, also takes up a considerable amount of time and therefore causes an increase in costs.

SUMMARY OF THE INVENTION

The purpose of the present invention is to provide a gripping device which enables the operator to grip said unit with an accurate, firm and safe grip.

A further purpose of the present invention is to permit the positioning of the milking unit in an easy and accurate manner, avoiding unnatural stances of the operator.

A further purpose of the present invention is to make the maintenance and/or replacement of components of the milking unit or of the milking unit itself fast and easy.

A further purpose of the present invention is to provide a gripping device for milking units suitable for ensuring a high level of resistance and reliability over time and, in addition, such as to be easily and economically produced.

These and further purposes are achieved by the gripping device for milking units provided with a manifold, a pulse tube, shells and teat-cups to be connected to the udders of the animal, with said gripping device applied to a terminal portion of the pulse tube connected to the manifold and comprising means for a firm, safe and ergonomic grip and means for quick replacement and maintenance of the unit or components thereof.

BRIEF DESCRIPTION OF THE DRAWINGS

The construction and functional characteristics of the gripping device for milking units of the present invention will be more clearly comprehensible from the detailed description below, in which reference is made to the appended drawings which show a preferred and non-limiting embodiment and wherein:

FIGS. 4 and 5 schematically show the axonometric views of two constituent components of the device of the invention;

FIG. 6 schematically shows an exploded axonometric view of the gripping device of the invention.

DETAILED DESCRIPTION OF THE PREFERRED EMBODIMENTS

Figure 1:
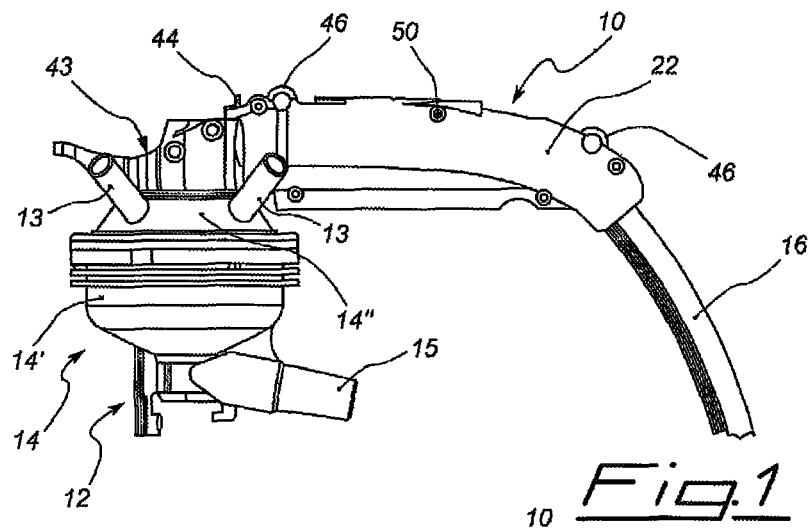
FIG. 1 schematically shows a side view of a milking unit fitted with the gripping device of the invention.
Figure 2:
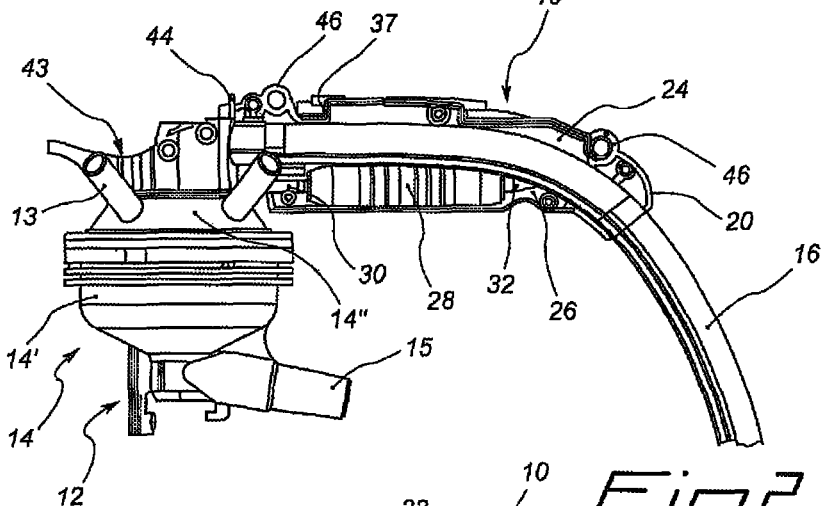
FIG. 2 schematically shows a cross-section of the gripping device of the invention.
Figure 3:
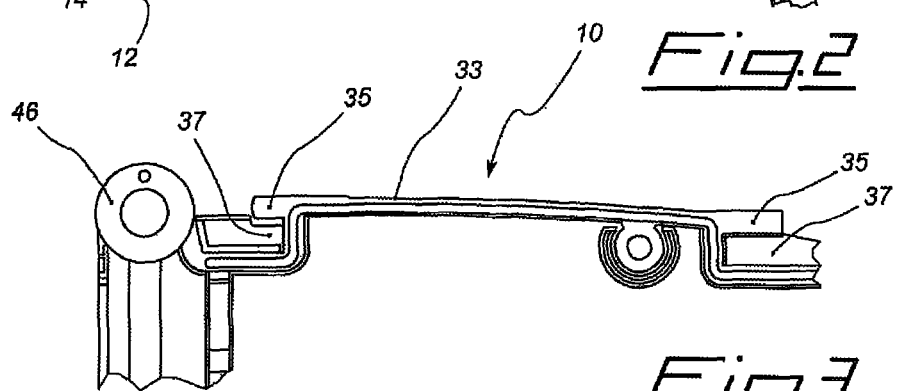
FIG. 3 schematically shows a detailed view of a part of the gripping device of the invention.

With reference to the aforementioned FIGS., the gripping device for a milking unit, globally denoted by reference numeral 10, is shown applied to a traditional and known milking unit 12, by way of a non-limiting example, of the single udder quarter type which comprises a manifold 14, fitted with an output tube 15 placed on the bottom of a lower portion 14' of the manifold and needed for the connection of a duct for the collection of the drawn milk transiting in the manifold, two or four ducts 13 externally extending on the upper portion 14" of the manifold on the opposite side to that of the output tube 15 to which two or four bosses fitted with teat-cups (not shown in the drawing) are connected, a pulse tube 16 connected to the manifold 14.

The gripping device 10 comprises, preferably but not exclusively, two half-shells 20 and 22, made of plastic or other material suited to the purpose and each defined by a single body or composed of two or more elements coupled to each other, which partially embrace the manifold 14 and the pulse tube 16, the latter by a length tendentially equal to the average dimensions of the hand of an individual dictated by ergonomic principles.

In an alternative embodiment the grip embraces the portion of pulse tube by a length tendentially equal to the average dimensions of the hand of an individual, not in a continuous manner but along one or more sections of the length of the same.

Grooved profiles are formed on the coupling surfaces between the two half-shells 20 and 22 having the function of forming labyrinth paths for the accumulation, flow and evacuation of dirt and/or liquids which may find themselves on the milking unit (not shown in the drawings).

Each of the half-shells 20, 22 is internally substantially subdivided into an upper 24 and lower portion or chamber 26, respectively suitable for receiving the portion of the pulse tube 16 starting from the hooking point thereof to the manifold 14 and a connector 28, in a single element or several elements joined to each other, the function of which is described in detail below.

The upper portion or chamber 24 has a shaped longitudinal development and a partially rectilinear pattern and partially curvilinear such as to follow the natural bending of the pulse tube 16.

The same upper portion or chamber 24 has a number of ribs 25 transversally arranged and shaped in a corresponding way to the side profile of the pulse tube 16 so as to embrace it and at the same time stabilise it inside the upper chamber.

The manifold, positioned inside the lower portion or chamber 26 has the function of enabling the connection of a first section of signal cable 30 of a sensor (i.e., sensor inside the manifold 14) and a second section of signal cable 32 of the sensor, with the first section of signal cable 30 connected to the manifold 14 and the second section of signal cable 32 coming out of said connector which enters, preferably but not exclusively, the pulse tube 16 and runs along the same as far as its point of connection to a control unit (not shown in the drawings).

The first section of signal cable 30 passes through a grommet element 34 made of plastic material and housed in a pocket 36 formed at the end of the lower portion or chamber 26 of each of the half shells 20 and 22 facing towards the manifold 14. The grommet element 34 has the function of obstructing the entrance of dirt, dust, external materials and similar into the lower portion or chamber 26.

Each of the half-shells 20, 22 in the upper part facing in the direction of the upper portion or chamber 24, has an expansion or appendix 33 extending vertically and from the ends of which two opposed and symmetrical extensions 35 extend horizontally, defining in the lower part thereof comprised between the lower front of said extensions and the upper front of the half-shell, two recesses 37 suitable for permitting, when the two half-shells 20, 22 are joined, hooking to an optional support (not shown in the drawings).

Along the external profile of the half-shell 20 a recess or cavity 38 is formed suitable for receiving a corresponding projection or lip 40 formed along the external profile of the half-shell 22. An optional gasket (not shown in the drawings) or a film of silicone or equivalent known insulating material is interposed between said recess 38 and lip 40 suitable for preventing infiltrations of dust, liquids or similar.

The end of each of the two half-shells 20, 22 facing towards the manifold 14 has a tab 42 which, starting from the upper front of the half-shell develops transversally with a length basically equal to the width or transversal dimension of the half-shell in the direction of the manifold 14.

When the two half-shells 20 and 22 are coupled around the pulse tube 16 and the manifold 14, the tabs 42 thereof embrace and surround a tab 44 extending vertically starting from the upper front of a split pin 43 attached to the upper portion 14" of the manifold 14 so as to define a release-preventing element for the manifold from the gripping device.

In addition, on the upper front of each of the two half-shells 20, 22 at least one ring 46 is formed for hooking the milking unit to an automatic release hook (not shown in the drawings) of the milking unit. In the preferred embodiment in the drawings there are two rings 46.

With particular reference to the preferred embodiment in the drawings, the two half-shells 20 and 22 are connected to each other by means of screws 48 and nuts 50 or equivalent known check means. In an alternative embodiment the connection of the two half-shells may consists of quick attachment/release elements of the snap-fit type or similar.

Figure 7:
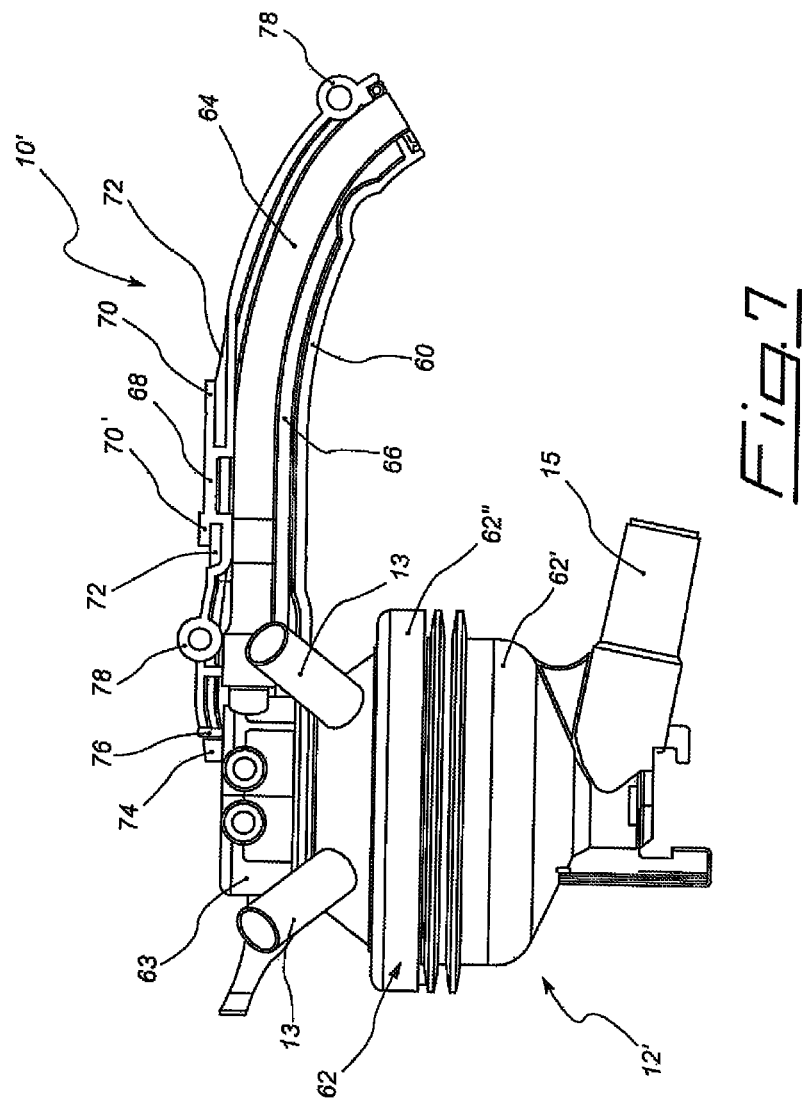
FIG. 7 schematically shows a cross-sectional view of the gripping device of the invention according to an alternative embodiment configuration and utilisable for milking units with a two channel pulse tube and without signal cables for controlling the single udder quarter.

With particular reference to FIG. 7, an alternative embodiment of the gripping device according to the invention is schematised, specially adapted for application to a milking unit with a two channel pulse tube and without signal cables for control of the single udder quarter.

The gripping device, globally denoted in FIG. 7 by reference numeral 10', comprises two half-shells 60 (in the figure only one of said shells is shown in that the other has entirely analogous and symmetrical characteristics), made of plastic or other material suited to the purpose and each defined by a single body or composed of two or more elements coupled to each other, which partially embrace a manifold 62 (preferably comprising a lower portion 62' and an upper portion 62") of a milking unit 12' and a pulse tube 64, the latter by a length equal to the average dimensions of the hand of an individual dictated by ergonomic principles. In this case as well, the grip according to the invention may embrace the pulse tube along the defined section in a continuous manner or discontinuous manner along one or more sections of the grip length.

Grooved profiles are formed on the coupling surfaces between the two half-shells, as in the preferred embodiment described above, having the function of forming labyrinth paths for the accumulation, flow and evacuation of dirt and/or liquids which may find themselves on the milking unit (not shown in the drawings).

Each of the half-shells 60 comprises an inner portion or chamber 66 suitable for receiving the section of the pulse tube 64 starting from its point of attachment to the manifold 62. Such inner portion or chamber 66 has a shaped longitudinal development and a partially rectilinear pattern and partially curvilinear such as to follow the natural bending of the pulse tube 64.

Each of the half-shells 60, in the upper part has an expansion or appendix 68 extending vertically and from the ends of which two opposed and symmetrical extensions 70 and 70' extend horizontally, defining in the lower part thereof comprised between the lower front of said extensions and the upper front of the half-shell, two recesses 72 suitable for permitting, when the two half-shells 60 are joined, hooking to an optional support (not shown in the drawings).

As referred to in the preferred embodiment described above, the two half-shells of the alternative embodiment may have, along the external profile a recess or cavity and a corresponding projection such as to permit the rapid and easy bringing together and stabilisation of the two half-shells with the optional interposition of a gasket so as to insulate or seal against the entrance of liquids, dust and similar impurities.

The end of each of the two half-shells 60 facing towards the manifold 62 has a tab 74 which, starting from the upper front of the half-shell extends transversally with a length basically equal to the width or transversal dimension of the half-shell in the direction of the manifold 62.

When the two half-shells 60 are coupled to each other around the pulse tube 64 and the manifold 62, the tabs 74 thereof embrace and surround a tab 76 extending vertically starting from the upper front of a split pin 67 attached to the upper portion 62" of the manifold 62 so as to define a release-preventing element for the manifold from the gripping device.

In addition, on the upper front of each of the two half-shells 60, at least one ring 78 is formed for hooking the milking unit to an automatic release hook of the milking unit (not shown in the drawings).

The two half-shells 60 are connected to each other by means of screws and nuts or equivalent known check means or by means of quick attachment/release elements of the snap-fit type or similar.

In an alternative embodiment the grip is made in a single piece.

As may be seen from the above, the advantages which the gripping device according to the invention provides are evident and significant.

The gripping device for a milking unit according to the present invention advantageously provides the operator with a milking unit such as to permit the rapid and convenient gripping and positioning thereof in relation to the udders of the animal, exploiting the possibility of a comfortable and firm grip thanks to the ergonomic nature of the grip or gripping device.

A further advantage of the invention relates to the fact that the presence of the gripping device makes it possible to position the milking unit without the operator having to adopt awkward and unnatural stances.

A further advantage of the invention relates to the fact that the gripping device according to the invention makes maintenance operations and component replacement easier and faster thanks to the presence of the manifold.

A still further advantage is represented by the fact that by being positioned around the pulse tube the device according to the invention does not detract space from the milking unit or modify its position in relation to the udder of the animal to which said unit is attached.

It can be seen that advantageously, the gripping device according to the invention can be applied to both milking systems of the single udder quarter type and to traditional mechanised systems.

Despite the invention having been described above with particular reference to one of its embodiments, given solely by way of a non-limiting example, numerous modifications and variants will appear evident to a person skilled in the art in the light of the above description. The present invention therefore sets out to embrace all the modifications and variants which fall within the sphere and scope of the following claims.

LIST OF REFERENCES

10 Gripping Device
10' Gripping Device
12 Milking Unit
12' Milking Unit
14 Manifold
14" Upper Portion of the Manifold
16 Pulse Tube
20 Half-Shell
22 Half-Shell
24 Upper Portion Chamber
25 Ribs
26 Lower Portion Chamber
28 Connector
30 Signal Cable
32 Signal Cable
33 Appendix
34 Grommet Element
35 Opposed and Symmetrical Extension
36 Pocket
37 Recess
38 Recess or Cavity
40 Projection or Lip
42 Tab
43 Split Pin
44 Tab
46 Ring
48 Screws
50 Nuts
60 Half-Shell
62 Manifold
62' Lower Portion of the Manifold
62" Upper Portion of the Manifold
63 Split Pin
64 Pulse Tube
66 Inner Portion of Chamber
67 Split Pin
68 Appendix
70 Opposed and Symmetrical Extension
70' Opposed and Symmetrical Extension
72 Recess
74 Tab
76 Tab
78 Ring

The invention claimed is:

1. A gripping device for a milking unit for milking an animal, the milking unit provided with a manifold, a pulse tube, shells and teat-cups adapted to be connected to the udder of the animal, said gripping device being applied on a terminal portion of said pulse tube connected to the manifold, said gripping device comprising gripping means and means for a quick replacement and maintenance of the unit or components thereof, said gripping device being characterised in that:

said gripping means comprises two half-shells made of plastic material, each said half-shell being in at least one piece and partially embracing said manifold and said pulse tube, the latter being embraced by a length equal to the average dimensions of the hand of an individual in a continuous or discontinuous manner, and in that quick disconnect means is provided for a quick replacement and maintenance of the unit or components thereof, said quick disconnect means being comprised of a connector made in a single piece or defined by a plurality of elements adapted to be reciprocally connected, said connector being positioned inside said two half-shells and connected at one end, with a first section of signal cable of a sensor connected to a control unit and partially inserted in said pulse tube, and at the other end connected to a second section of signal cable of the same sensor.

2. The gripping device as claimed in claim 1, characterised in that each one of said two half-shells is internally subdivided in an upper portion or chamber and in a lower portion or chamber, respectively adapted to receive a portion of said pulse tube starting from a hooking point thereof with respect to said manifold and said connector, each one of said two half-shells having an inner portion or chamber adapted to receive said portion of said pulse tube starting from the hooking point thereof with respect to said manifold, the upper portion or chamber and the inner portion or chamber having a shaped longitudinal development and a partially rectilinear pattern and being partially curvilinear so as to follow a natural bending of said pulse tube, the upper portion or chamber provided with a number of ribs transversally arranged and shaped corresponding to the side profile of said pulse tube.

3. The gripping device as claimed in claim 2, characterised in that each one of said two half-shells in the upper part at the upper portion or chamber has an expansion or appendix vertically developed from the ends thereof, and further develop, in horizontal direction, two opposed and symmetrical extensions defining, in the lower part thereof and between the lower front of said extensions and the upper front of said half-shell, two recesses adapted to allow hooking to an optional support when the two half-shells are united.

4. The gripping device as claimed in claim 3, characterised in that along the external profile of the half-shell is formed a recess or cavity adapted to receive a corresponding projection or lip formed along the external profile of the half-shell, a gasket or a film of insulating silicone is interposed between said recess and said lip with the purpose to prevent infiltration of dust, liquids or the like.

5. The gripping device as claimed in claim 4, characterised in that it comprises, at the end of each one of said two half-shells facing towards said manifold, a tab which, starting from the upper front of each half-shell, develops transversally with a length basically equal to the width or transverse dimension of the half-shell thereof, said tabs of said two half-shells being adapted to embrace and surround, when said half-shells are coupled, a tab vertically developed starting from the upper front of a split pin stabilised to an upper portion of said manifold so as to define a release-preventing element for said manifold.

6. The gripping device as claimed in claim 5, characterised in that on the upper front of each of said two half-shells is formed at least one ring for the hooking of the milking unit with respect to an automatic release hook of the milking unit.

7. The gripping device as claimed in claim 6, characterised in that it comprises a grommet element made of plastic material and arranged in a pocket formed at the end of the lower portion or chamber facing towards said manifold and adapted to allow the passage of the first section of a signal cable of a sensor and to prevent the access of dirt, dust, external materials and the like in the lower portion or chamber.

8. The gripping device as claimed in claim 2, characterised in that each one of said two half-shells in the upper part at the upper portion or chamber has an expansion or appendix vertically developed from the ends thereof, and further develop, in horizontal direction, two opposed and symmetrical extensions defining, in the lower part thereof and between the lower front of said extensions and the upper front of said half-shell, two recesses adapted to allow hooking to an optional support when the two half-shells and the half-shells are united.

9. The gripping device as claimed in claim 8, characterised in that along the external profile of the half-shell is formed a recess or cavity adapted to receive a corresponding projection or lip formed along the external profile of the half-shell, a gasket or a film of insulating silicone is interposed between said recess and said lip with the purpose to prevent infiltration of dust, liquids or the like.

10. The gripping device as claimed in claim 9, characterised in that it comprises, at the end of each one of said two half-shells facing towards said manifold, a tab which, starting from the upper front of each half-shell, develops transversally with a length basically equal to the width or transverse dimension of the half-shell thereof, said tabs of said two half-shells being adapted to embrace and surround, when said half-shells are coupled, a tab vertically developed starting from the upper front of a split pin stabilised to an upper portion of said manifold so as to define a release-preventing element for said manifold.

11. The gripping device as claimed in claim 10, characterised in that on the upper front of each of said two half-shells is formed at least one ring for the hooking of the milking unit with respect to an automatic release hook of the milking unit.

12. The gripping device as claimed in claim 11, characterised in that it comprises a grommet element made of plastic material and arranged in a pocket formed at the end of the lower portion or chamber facing towards said manifold and adapted to allow the passage of the first section of a signal cable of a sensor and to prevent the access of dirt, dust, external materials and the like in the lower portion or chamber.

13. A gripping device for a milking unit for milking an animal, the milking unit provided with a manifold, a pulse tube, shells and teat-cups adapted to be connected to the udder of the animal, said gripping device being applied on a terminal portion of said pulse tube connected to the manifold, said gripping device comprising gripping means and means for a quick replacement and maintenance of the unit or components thereof, characterised in that:

said gripping means comprises two half-shells made of plastic material, each said half-shell being in one piece and partially embracing said manifold and said pulse tube, said pulse tube being embraced by a length equal to the average dimensions of the hand of an individual in a continuous or discontinuous manner, and in that quick disconnect means is provided for a quick disconnect and replacement and maintenance of the unit or components thereof, said quick disconnect means being comprised of a connector device made in a single piece, said connector device being positioned inside said two half-shells and connected at one end, with a first section of signal cable of a sensor connected to a control unit and partially inserted in said pulse tube, and at the other end connected to a second section of signal cable of the same sensor.

14. The gripping device as claimed in claim 13, characterised in that each one of said two half-shells is internally subdivided in an upper portion or chamber and in a lower portion or chamber, respectively adapted to receive a portion of said pulse tube starting from a hooking point thereof with respect to said manifold and said connector, each one of said two half-shells having an inner portion or chamber adapted to receive said portion of said pulse tube starting from the hooking point thereof with respect to said manifold, the upper portion or chamber and the inner portion or chamber having a shaped longitudinal development and a partially rectilinear pattern and being partially curvilinear so as to follow a natural bending of said pulse tube, the upper portion or chamber provided with a number of ribs transversally arranged and shaped corresponding to the side profile of said pulse tube.

15. The gripping device as claimed in claim 14, characterised in that each one of said two half-shells in the upper part at the upper portion or chamber has an expansion or appendix vertically developed from the ends thereof, and further develop, in horizontal direction, two opposed and symmetrical extensions defining, in the lower part thereof and between the lower front of said extensions and the upper front of said half-shell, two recesses adapted to allow hooking to an optional support when the two half-shells are united.

16. The gripping device as claimed in claim 15, characterised in that along the external profile of the half-shell is formed a recess or cavity adapted to receive a corresponding projection or lip formed along the external profile of the half-shell, a gasket or a film of insulating silicone is interposed between said recess and said lip with the purpose to prevent infiltration of dust, liquids or the like.

17. The gripping device as claimed in claim 16, characterised in that it comprises, at the end of each one of said two half-shells facing towards said manifold, a tab which, starting from the upper front of each half-shell, develops transversally with a length basically equal to the width or transverse dimension of the half-shell thereof, said tabs of said two half-shells being adapted to embrace and surround, when said half-shells are coupled, a tab vertically developed starting from the upper front of a split pin stabilised to an upper portion of said manifold so as to define a release-preventing element for said manifold.

18. The gripping device as claimed in claim 17, characterised in that on the upper front of each of said two half-shells is formed at least one ring for the hooking of the milking unit with respect to an automatic release hook of the milking unit.

19. The gripping device as claimed in claim 18, characterised in that it comprises a grommet element made of plastic material and arranged in a pocket formed at the end of the lower portion or chamber facing towards said manifold and adapted to allow the passage of the first section of a signal cable of a sensor and to prevent the access of dirt, dust, external materials and the like in the lower portion or chamber.

20. A gripping device for a milking unit for milking an animal, the milking unit provided with a manifold, a pulse tube, shells and teat-cups adapted to be connected to the udder of the animal, said gripping device being applied on a terminal portion of said pulse tube connected to the manifold, said gripping device comprising gripping means and means for a quick replacement and maintenance of the unit or components thereof, characterised in that:

said gripping means comprises two half-shells made of plastic material, each said half-shell being in more than one piece and partially embracing said manifold and said pulse tube, the latter being embraced by a length equal to the average dimensions of the hand of an individual in a continuous or discontinuous manner, and in that quick disconnect means is provided for a quick replacement and maintenance of the unit or components thereof, said quick disconnect means being comprised of a connector device defined by a plurality of elements adapted to be reciprocally connected, said connector device being positioned inside said two half-shells and connected at one end, with a first section of signal cable of a sensor connected to a control unit and partially inserted in said pulse tube, and at the other end connected to a second section of signal cable of the same sensor.

21. The gripping device as claimed in claim 20, characterised in that each one of said two half-shells is internally subdivided in an upper portion or chamber and in a lower portion or chamber, respectively adapted to receive a portion of said pulse tube starting from a hooking point thereof with respect to said manifold and said connector, each one of said two half-shells having an inner portion or chamber adapted to receive said portion of said pulse tube starting from the hooking point thereof with respect to said manifold, the upper portion or chamber and the inner portion or chamber having a shaped longitudinal development and a partially rectilinear pattern and being partially curvilinear so as to follow a natural bending of said pulse tube, the upper portion or chamber provided with a number of ribs transversally arranged and shaped corresponding to the side profile of said pulse tube.

\* \* \* \* \*